(12) United States Patent
Gilberti et al.

(10) Patent No.: US 6,302,261 B1
(45) Date of Patent: Oct. 16, 2001

(54) SAFETY COUPLING FOR IN-LINE INDEXER

(75) Inventors: Joseph J. Gilberti, 45 Long View Rd., Avon, CT (US) 06001; Gary C. Todd, Windsor, CT (US)

(73) Assignee: Joseph J. Gilberti, Avon, CT (US)

( * ) Notice: Subject to any disclaimer, the term of this patent is extended or adjusted under 35 U.S.C. 154(b) by 0 days.

(21) Appl. No.: 09/255,066

(22) Filed: Feb. 22, 1999

(51) Int. Cl.$^7$ ................................ B65G 17/06
(52) U.S. Cl. .................... 198/465.1; 198/832.1
(58) Field of Search .................... 198/343.1, 465.1, 198/832.1

(56) References Cited

U.S. PATENT DOCUMENTS 5,076,172 * 12/1991 Grimm et al. .................... 104/166
5,735,384 * 4/1998 Lingo et al. .................... 198/343.1 X

* cited by examiner

Primary Examiner—Janice L. Krizek
(74) Attorney, Agent, or Firm—Alix, Yale & Ristas, LLP

(57) ABSTRACT

A detented safety coupling assembly for use with an indexing apparatus for advancing a workpiece through a series of workstations is disclosed. The indexing apparatus may include a plurality of workstations arranged in spaced relationship, at least one pallet which supports the workpiece as it passes through the workstations and a drive assembly for moving the pallet through the workstations. The safety coupling assembly releasably couples the drive assembly and the pallet such that movement of the drive assembly causes corresponding movement of the pallet when the forces acting on the coupling assembly do not exceed a predetermined value. The coupling assembly ceases to couple the drive assembly and the pallet, without breakage, when the forces acting on the coupling assembly exceed a predetermined value.

19 Claims, 13 Drawing Sheets

SAFETY COUPLING FOR IN-LINE INDEXER

BACKGROUND OF THE INVENTION

1. Field of the Invention

The present invention relates to an indexing apparatus having a plurality of work platens or pallets movable through successive workstations. More particularly, the present invention relates to methods and apparatus for safely coupling the platens to a drive assembly during operation of the apparatus. Accordingly, the general objects of the present invention are to provide novel and improved methods and apparatus of such character.

2. Description of the Related Art

It is known in the indexer art that endless conveyors containing a plurality of platforms (also described herein as platens or pallets) can be used to move workpieces on the platens through the various workstations. It is also known to use such apparatus in the screen printing art. However, problems with multi-color printers of the related art arise from the fact that such printers have a fixed configuration with a fixed number of printing stations printing a fixed number of colors. If additional colors are to be printed, the workpieces, in the typical case a print substrate, must be run through the same or a different printer having the additional colors. This greatly limits productivity.

Other deficiencies associated with indexing apparatus used with printers of the related art result from the shear size and massiveness of the related art printing apparatus. In particular, it is noted that printing apparatus of this type can be almost 40 feet long and weigh on the order of 20,000 pounds. The sheer size and weight of such apparatus give rise to the danger that the apparatus operators can be seriously injured due to (1) equipment failure; (2) the inadvertent introduction of foreign objects into the apparatus; and/or (3) partial or complete entrapment in the apparatus. Moreover, even minor malfunctions of such machinery can lead to operator injury and/or additional damage to the apparatus itself. For example, decoupling of the platens from the drive assembly in a conventional indexer can easily lead to a "pile-up" of platens before the apparatus can be manually shut-down.

Traditionally, efforts to reduce or eliminate such dangers have focused the use of shear pins which mechanically couple the platens and the associated drive assembly. Basically, such shear pins provide a replaceable "weak link" in the system so that the damage caused by many apparatus failures will be limited to breakage of the shear pin. For example, inadvertent placement of a foreign object into the path of the platens will merely stop movement of the platen and break the shear pin. Since such a foreign object may be an operator's appendage, use of the shear pin may very well save the operator from serious injury.

The shear pin arrangements of the related art, however, suffer from many deficiencies. First, each time a shear pin serves its purpose of preventing substantial damage, the shear pin must be replaced. Depending on the particular circumstances, this may entail an extensive, expensive and lengthy procedure. Naturally, in the event that the shear pin breaks due to a very minor malfunction, the cost of replacing the shear pin can greatly exceed the damage which the shear pin actually prevented. Second, conventional shear pin arrangements cannot prevent damage resulting from a "pile-up" of platens once one shear pin has broken. In other words, indexing apparatus of the type discussed herein tend to be subjected to a "domino effect" once damage begins to occur. Conventional shear pin arrangements simply lack the ability to prevent consequential damage of this sort. Thus, conventional procedures require an operator to manually shut the apparatus down. This, however, requires a relatively long period of time during which simply unnecessary damage often occurs.

Accordingly, there remains a need in the art for improved indexing apparatus for use with a multi-station apparatus which can be combined, broken apart and reconfigured as desired while still providing a fast and effective safety mechanism for minimizing operator injury as well as damage to the apparatus itself.

There remains a further need in the art for an indexing apparatus which employs an improved safety coupling assembly which is capable of quickly and automatically shutting-down the apparatus in the event of a malfunction or operator injury.

There remains still another need in the art for an indexing apparatus utilizing an improved indexing apparatus which is capable of long term repeated use without suffering significant degradation in performance.

There is yet another need in the art for an improved indexing apparatus which prevents unnecessary consequential damage to the apparatus by eliminating further advancement of the platens in the event of apparatus failure.

SUMMARY OF THE INVENTION

Therefore, one object of the present invention is to provide an improved indexing apparatus having at least one platen and a plurality of workstations for advancing a workpiece through the workstations, the apparatus including at least one detented safety coupling for selectively coupling and decoupling of the platens.

A further object of the present invention is to provide an improved indexing apparatus having a modular arrangement of workstations whereby the number of workstations can be easily selected and changed including concommitent changes in the safety coupling assembly.

Still another object of the present invention is to provide an improved indexing apparatus for advancing at least one platen through a plurality of workstations wherein the apparatus includes a safety coupling assembly which prevents further advancement of the platen in the event of apparatus failure.

Yet another object of the present invention is to provide novel and improved indexing apparatus for sequentially advancing a workpiece through a plurality of workstations.

These and other objects and advantages of the present invention are provided by a detented safety coupling assembly for use with an indexing apparatus for advancing a workpiece through a series of workstations. The indexing apparatus may include a plurality of workstations arranged in spaced relationship, at least one pallet which supports the workpiece as it passes through the workstations and a drive assembly for moving the pallet through the workstations. The safety coupling assembly releasably couples the drive assembly and the pallet such that movement of the drive assembly causes corresponding movement of the pallet when the forces acting on the coupling assembly do not exceed a predetermined value. The coupling assembly ceases to couple the drive assembly and the pallet, without breakage, when the forces acting on the coupling assembly exceed a predetermined value. The safety coupling assembly also provides the capability of automatically and nearly instantaneously shutting-down the indexing apparatus in the event of failure.

In a preferred embodiment, the safety coupling assembly includes a drag-link pin movably attached to the drive assembly of the apparatus and a detented engagement assembly (such as a spring-loaded ball plunger) affixed to the pallet of the apparatus, the engagement assembly releasably engaging the drag-link pin. The drag-link pin is preferably attached to the drive assembly with a coupling pin which also defines a pivot point about which the drag-link pin may rotate. Moreover, means can be provided for rotating the drag-link pin about the pivot point when the engagement assembly becomes decoupled from the drag-link pin. In this manner, a portion of the drag-link pin can act as a flag which indicates that an error has occurred and that the apparatus should be shut-down.

Such an error can be detected by a light emitter/detector assembly such as a focused diode laser with a companion detector. Once an error has been detected, the apparatus can be automatically shut-down by a centralized controller. Since the coupling assembly is detented, both operator injury and apparatus damage can be avoided without any breakage of the apparatus whatsoever. Additionally, damage caused by platen pile-ups can be entirely avoided because the shut-down procedure is both rapid and entirely automated.

BRIEF DESCRIPTION OF THE DRAWINGS

FIG. 13b is a perspective view of the drag-link pin of FIG. 13a;

DESCRIPTION OF THE PREFERRED EMBODIMENT

Figure 1:
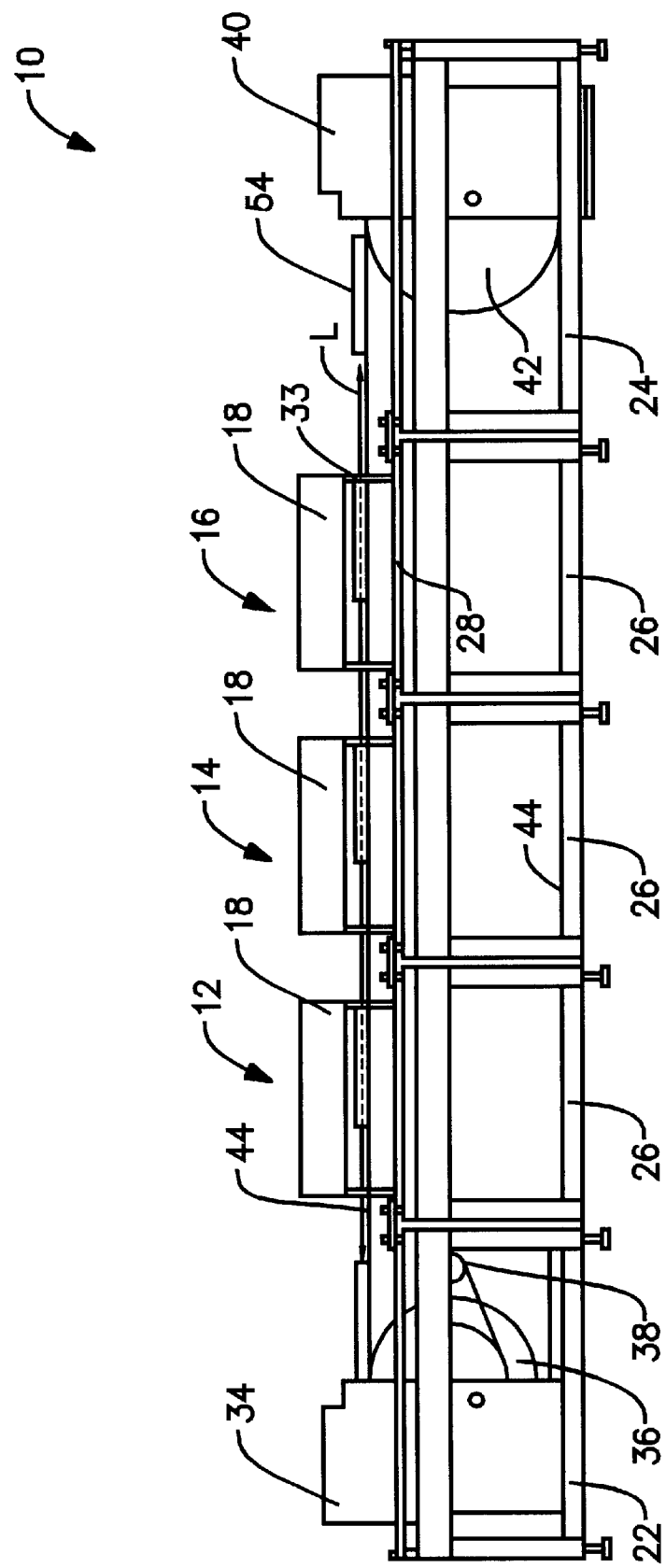
FIG. 1 is a front elevation view of an assembled screen printing apparatus incorporating various preferred features of the indexing apparatus of the present invention.

The present invention relates to indexing methods and apparatus for serially advancing workpieces through a series of workstations so that work steps can be performed on the workpiece at each workstation. Although various types of work can be performed on the workpieces at each station, the preferred embodiment is particularly suited for use in a multi-color screen printer wherein each workstation has a screen printer for one of the multi-colors. Therefore, the preferred embodiment of the invention will be described with various references to that particular use of the invention recognizing that other uses are just as viable and within the scope of the invention.

The indexing apparatus of the invention includes a plurality of frame sections which are detachably coupled together to form a linear path. A plurality of printing stations are located along the linear path, with each printing station being located on one of the frame sections. One printer is located at each printing station for printing a selected one of the plurality of colors to a substrate during a printing operation.

The indexing apparatus also includes a drive assembly supported on the frame sections. The drive assembly comprises a plurality of detachably connected segments, with each segment being dimensioned to correspond to a respective one of the frame sections. A plurality of platens are mechanically coupled to the drive assembly such that they are advanced by the drive assembly along the linear path to sequentially move the platen into proximity with each of the workstations. Each platen defines a support surface for supporting a substrate and a vacuum plenum which is in fluid communication with the support surface. A vacuum system is provided for applying suction at the support surface to hold the substrate in a fixed position on the support surface as the platens are being indexed along the path and while the platens are in position at the workstations during a printing operation.

The individual frame sections, drive assembly, printing stations and platens are assembled together as modular units. The apparatus can be configured with any number of modular units depending on the number of different colors that a particular printing job requires. This is accomplished simply by coupling the frame sections together and connecting the drive assembly to provide an in-line arrangement of the desired number of modular units, each of which is capable of printing a different color. Since, as noted above, the frame sections are detachably coupled together and the drive assembly is detachably connected, modular units can easily be added or removed to reconfigure the apparatus for printing any number of different colors.

The drive assembly preferably comprises an endless loop conveyor having an upper run which extends along the linear path. The conveyor preferably includes a drive chain mounted on a pair of sprockets, each supported on a frame section located, respectively, at opposite ends of the linear path, and a drive motor connected to one of the sprockets for driving the chain. The platens are coupled to the drive chain and are supported on a track which is mounted on the frame sections and extends around the endless loop. The drive chain includes a plurality of chain segments which are detachably connected together. Chain segments can be added or removed to provide a drive chain with the required length. The track on which the platens are supported as they are conveyed around the endless loop also comprises a plurality of detachably connected segments. As in the case of the drive chain, track segments are added or removed according to the number of frame sections coupled together in each particular configuration of the apparatus.

The vacuum system includes a plurality of stationary vacuum connectors and a plurality of movable vacuum connectors. Each stationary connector is supported in a fixed position on the apparatus and is associated with a respective one of the printing stations. Each stationary connector provides fluid communication between a vacuum source and the vacuum plenum of the particular platen positioned at the associated printing station during a printing operation. Each movable vacuum connector is mounted on the apparatus for synchronous movement with a respective one of the platens as the platen is indexed along the linear path between printing stations.

FIG. 1 of the drawings is a front elevation view showing the general overall arrangement of a modular multi-color screen printer 10 incorporating the present invention. In this case, three workstations generally designated 12, 14 and 16 have been utilized. At each workstation is a screen printer 18 with each one adapted to screen print a different color on a workpiece. Of course, the fact that three workstations 12, 14 and 16 and three screen printers 18 are illustrated is only by way of example and there can be as many stations and printers as desired for printing fewer or more colors.

Figure 2:
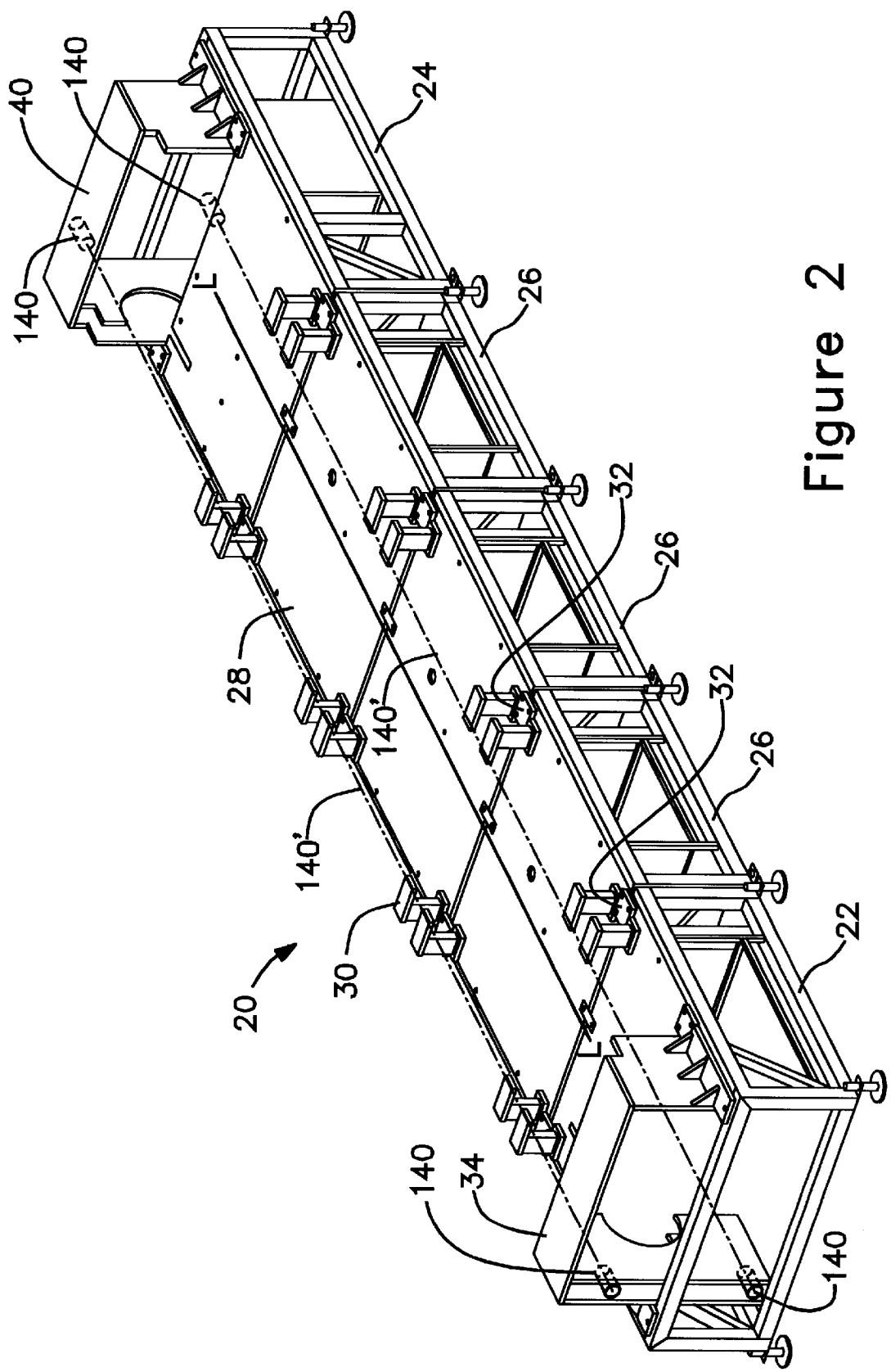
FIG. 2 is a perspective view of the assembled modular frame sections which form the base of the apparatus of FIG. 1.

Referring now to FIG. 2 in conjunction with FIG. 1, the base 20 of the conveyor system is an arrangement of modular units which comprises the two end units 22 and 24 and the three workstation units 26. Each workstation comprises a base framework and a top support plate 28. Each of these workstation units are separate modules which are fastened together to form the overall base 20. This is shown by the tie plates 32. The number of printing stations may be changed by adding or subtracting workstation units. The support brackets 30 are for mounting the conveyor track described below. The end unit 22 contains the conveyor drive housing 34, drive sprocket 36 and drive motor 38. The end unit 24 contains the conveyor idler housing 40 and idler sprocket 42.

Figure 3:
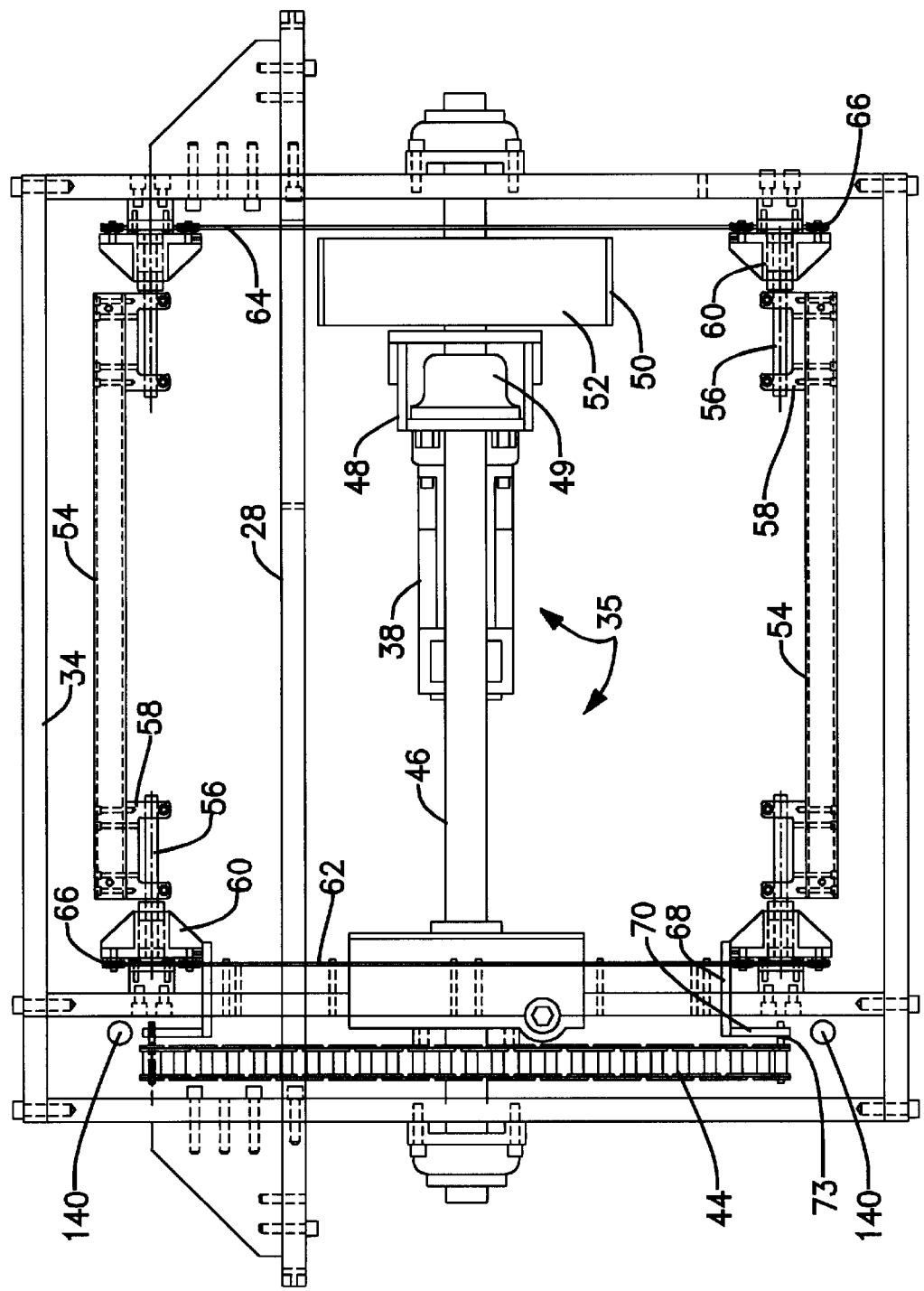
FIG. 3 is an end view of the apparatus of FIGS. 1 and 2 showing the chain conveyor mechanism with the work support platens attached to the chain and supported for movement.
Figure 4:
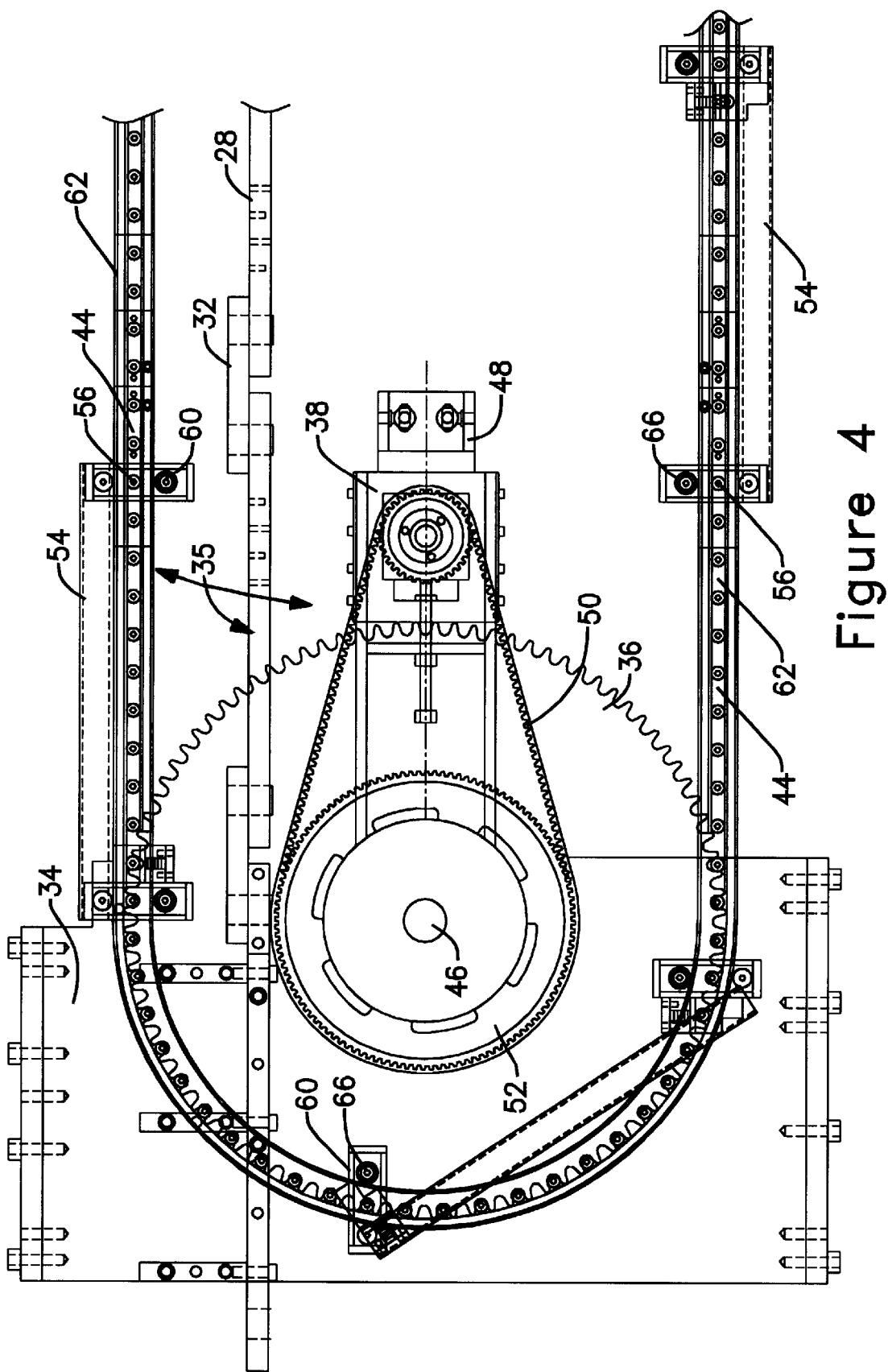
FIG. 4 is a side elevation view of a portion of the chain conveyor mechanism of FIG. 3 showing the sides of platens.

Referring now particularly to FIGS. 3 and 4, drive assembly 35 includes, inter alia, motor 38, a drive chain 44 and sprockets 36 and 42. The drive chain 44 goes around the drive sprocket 36 and the idler sprocket 42 (FIG. 1) to form the endless conveyor. The drive sprocket 36 is mounted on the shaft 46 which is mounted in the drive housing 34. The drive motor 38 is mounted on the motor bracket 48 which is attached to the base frame and also mounted to the drive shaft 46 via the pillow block 49. The drive belt 50 from the drive motor to the pulley 52 drives the shaft 46 and the drive sprocket 36.

Also shown in FIGS. 3 and 4 are the platens 54. Platens 54 are rotatably mounted at each corner by an axle shaft 56 (also acting as a rigid and elongated alignment registration member) which preferably extends perpendicularly to the linear path L. Axle shaft 56 extends through the platen support brackets 58 and is rigidly affixed to a predetermined location of the platen. Platen mounting brackets (or bogies) 60 are preferably movably mounted on the tracks 62 and 64 by rollers 66 which are grooved to ride on the tracks 62 and 64. This preferred arrangement ensures accurate lateral and vertical placement of platens 54 relative to the workstations. The plates 68 are attached to the platen mounting brackets 60 and extend past and to the outside of track 62 to a point adjacent chain 44. Plates 68 are mechanically coupled to chain 44 by means of a drag-link pin assembly 120. In the preferred embodiment, drag-link pin assembly 120 includes a drag-link pin 70, a coupler pin 73 (which movably attaches drag-link pin 70 to chain 44) and a detented engagement assembly 122 such as a spring-loaded ball plunger with a spring 122' and a ball 122" (which is suitably affixed to the platen 54 as shown).

As fully shown in FIGS. 13a–15, the engagement assembly 122 releasably engages drag-link pin 70 and coupler pin 73 defines a pivot point about which drag-link pin 70 can rotate upon decoupling of engagement assembly 122 and pin 70. Drag-link pin 70 preferably includes two portions which are disposed on opposite sides of the pivot point P defined by coupler pin 73. The first portion is preferably a flag portion 70' and the second portion is preferably a counter-balance portion 70". The weight of these two portions is distributed along the drag-link pin 70 such that, upon decoupling of coupling assembly 120, the flag portion 70' moves upwardly. In other words, during rotation, drag-link pin 70 moves from a retracted to an extended position. Naturally, other known means, such as a bias member, for rotating drag-link pin 7 can be used.

Figure 5:
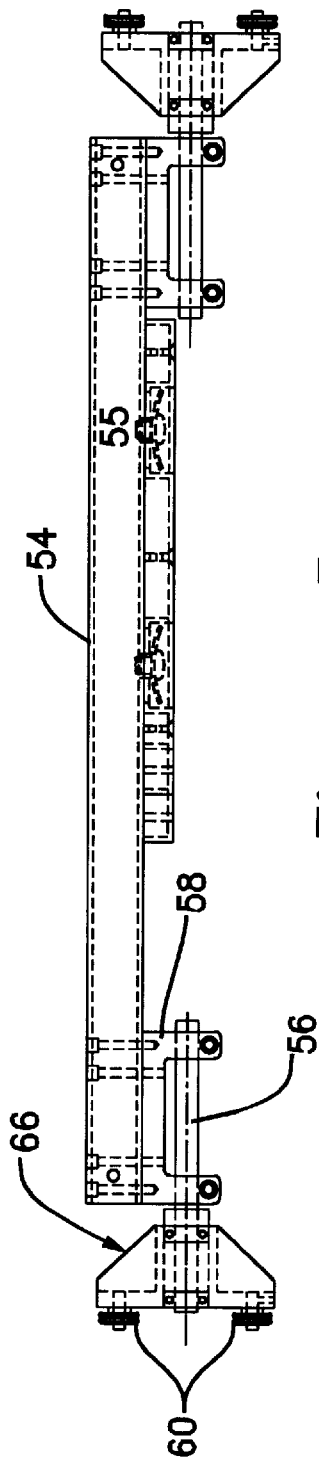
FIG. 5 is a front elevation view of a substantial portion of one of the platens depicted in FIGS. 3 and 4.
Figure 6:
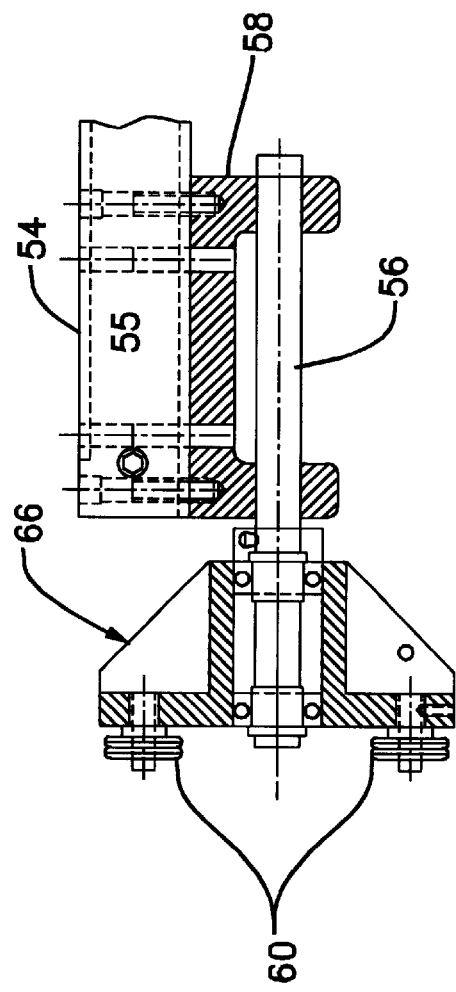
FIG. 6 is a detailed front elevation view of the left hand portion of the platen depicted in FIG. 5.
Figure 7:
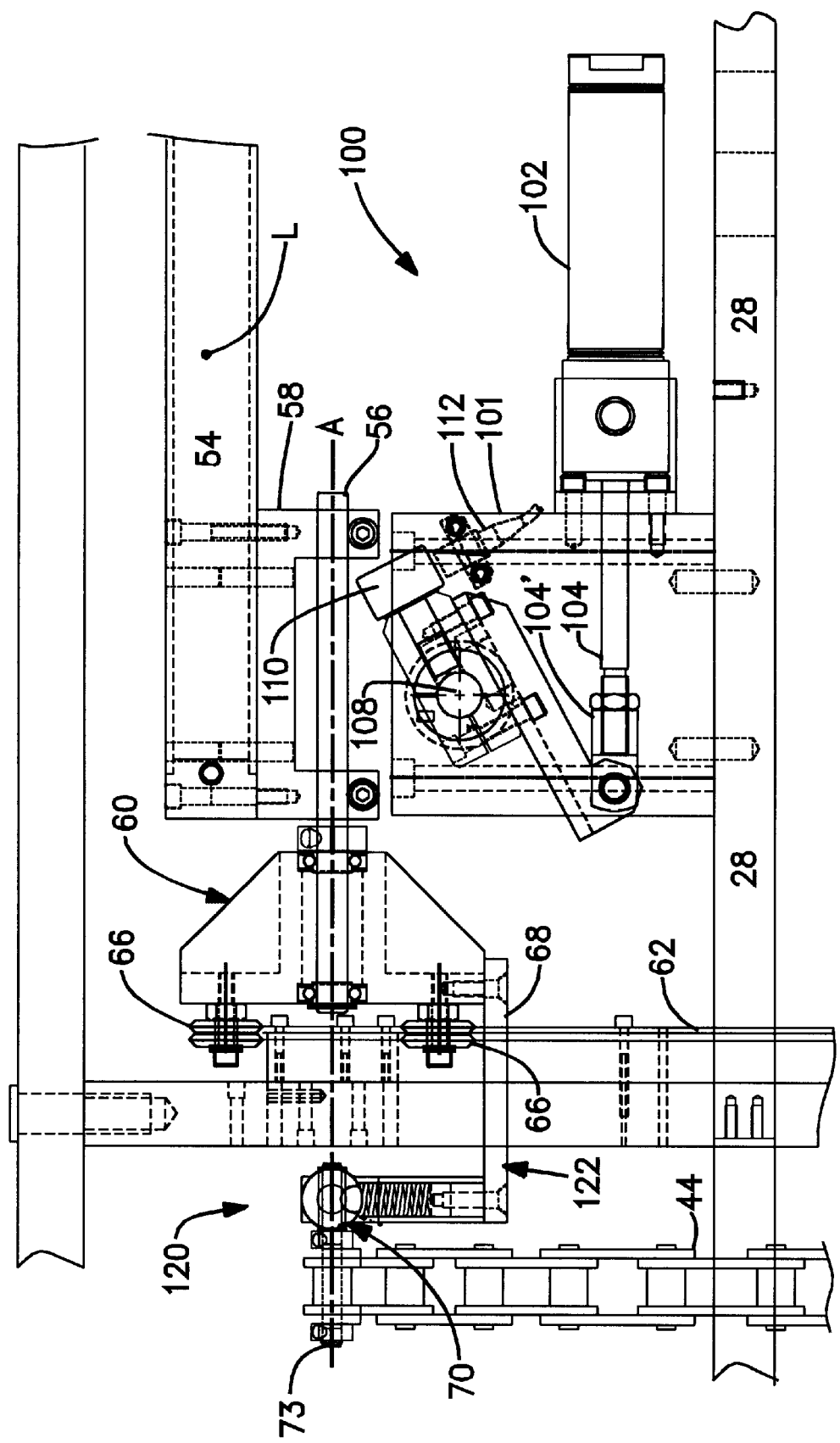
FIG. 7 is a front elevation view of a portion of an inventive indexing apparatus showing one registration assembly in a retracted position.

A platen 54 in accordance with the preferred embodiment of the present invention will now be described in additional detail with primary reference to FIGS. 5 and 6. As shown therein, platen 54 includes a generally planar platform 55 which has platen support brackets 58 with associated registration members 56 and bogies 60 attached thereto. It will be appreciated that the preferred form of platen 54 includes one platen support bracket 58 at each of four corners in order to ensure stable transport of platen 54 through the plurality of workstations. Naturally, other arrangements are also within the scope of the invention.

Each platen 54 also preferably includes a follower axle shaft (or registration member) 56, the axle shaft defining an elongated direction which is coaxial with axis A. At one end of axle shaft 56, bogie 60 is rotatably mounted to axle shaft 56. As shown, bogie 60 preferably includes a pair of opposing grooved rollers 66 which are designed for smooth conveyance along tracks 62 and 64.

Those of ordinary skill will readily appreciate that the paths of chain 44 and tracks 62 and 64 are generally congruent and ellipsoid in shape. The upper linear portion of the ellipsoid path of chain 44 and tracks 62 and 64 defines a linear work path L in the elongated direction of the plurality of workstations (FIGS. 1–2 and 7–8). While drive chain 44 advances platens 54 along the linear path, tracks 62 and 64 cooperates with bogies 60 to ensure smooth and predictable alignment of platen 54 in both lateral and vertical directions. Accordingly, accurate indexing of platens 54 in the direction of linear path L requires assistance from a registration assembly 100.

Figure 8:
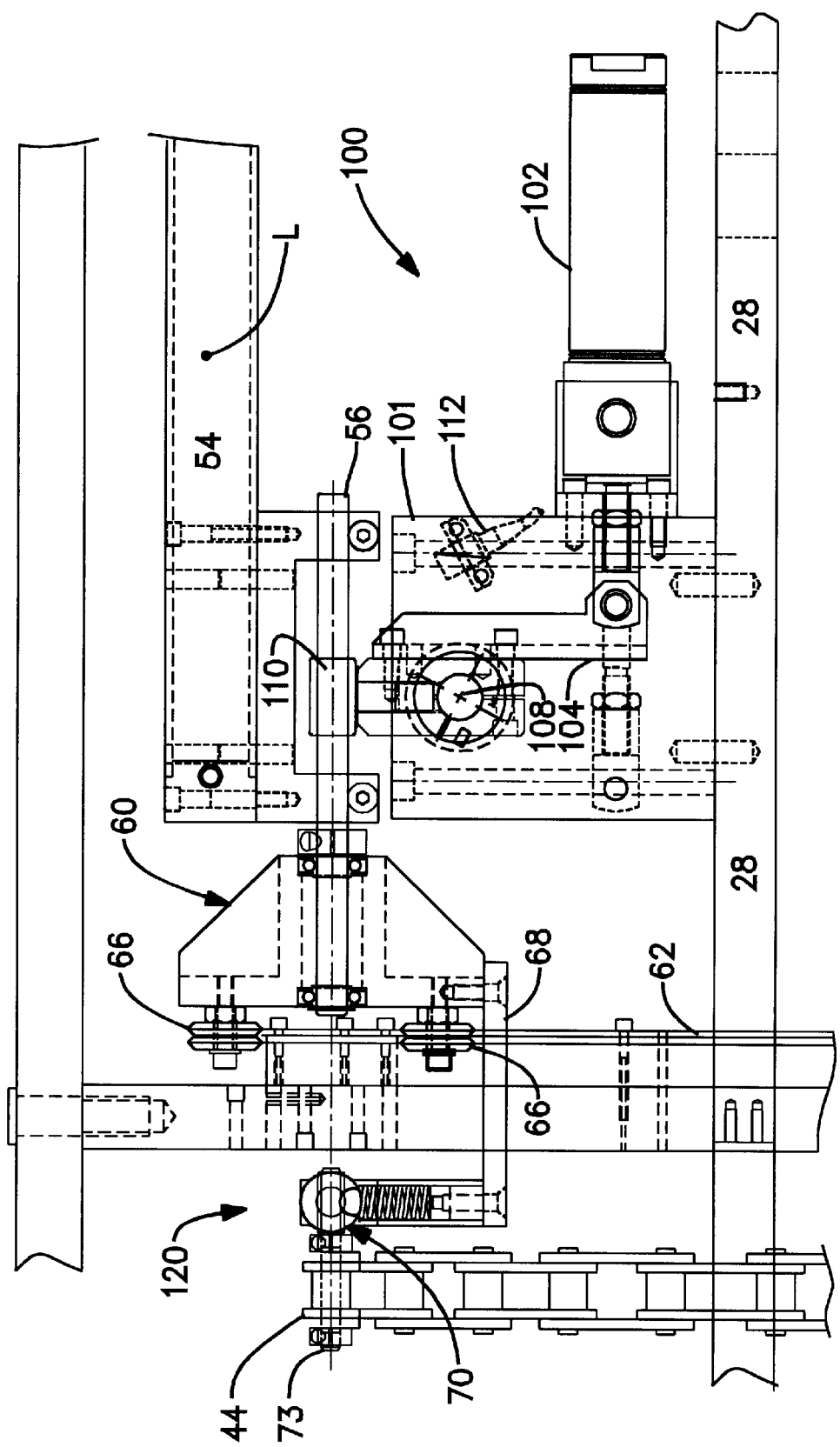
FIG. 8 is a front elevation view of a portion of the indexing apparatus of FIG. 7 showing the registration assembly in an alignment position.
Figure 9:
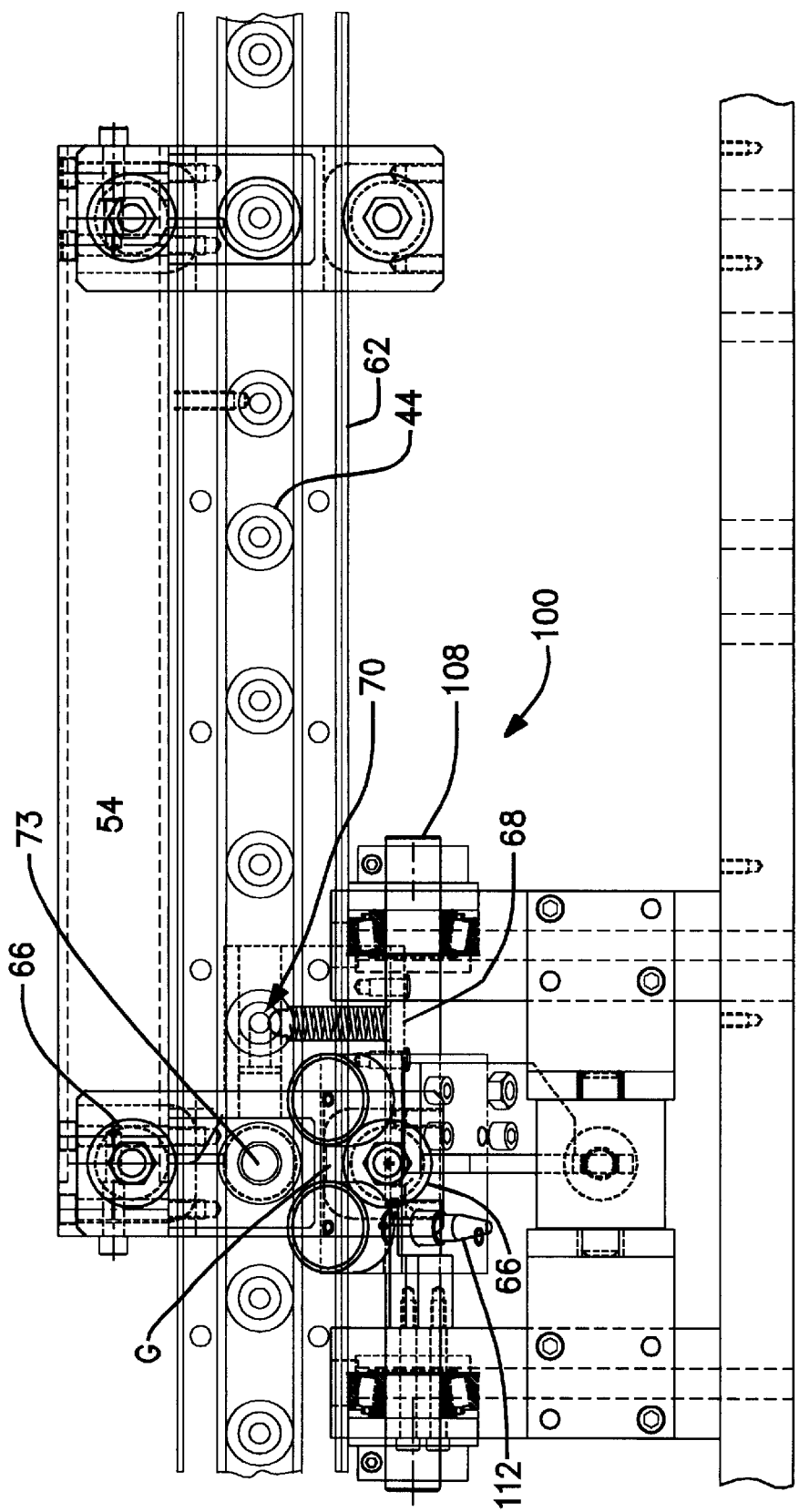
FIG. 9 is a side elevation view of the inventive indexing apparatus showing interaction between one platen and a registration assembly, the registration assembly being shown in the retracted position.
Figure 10:
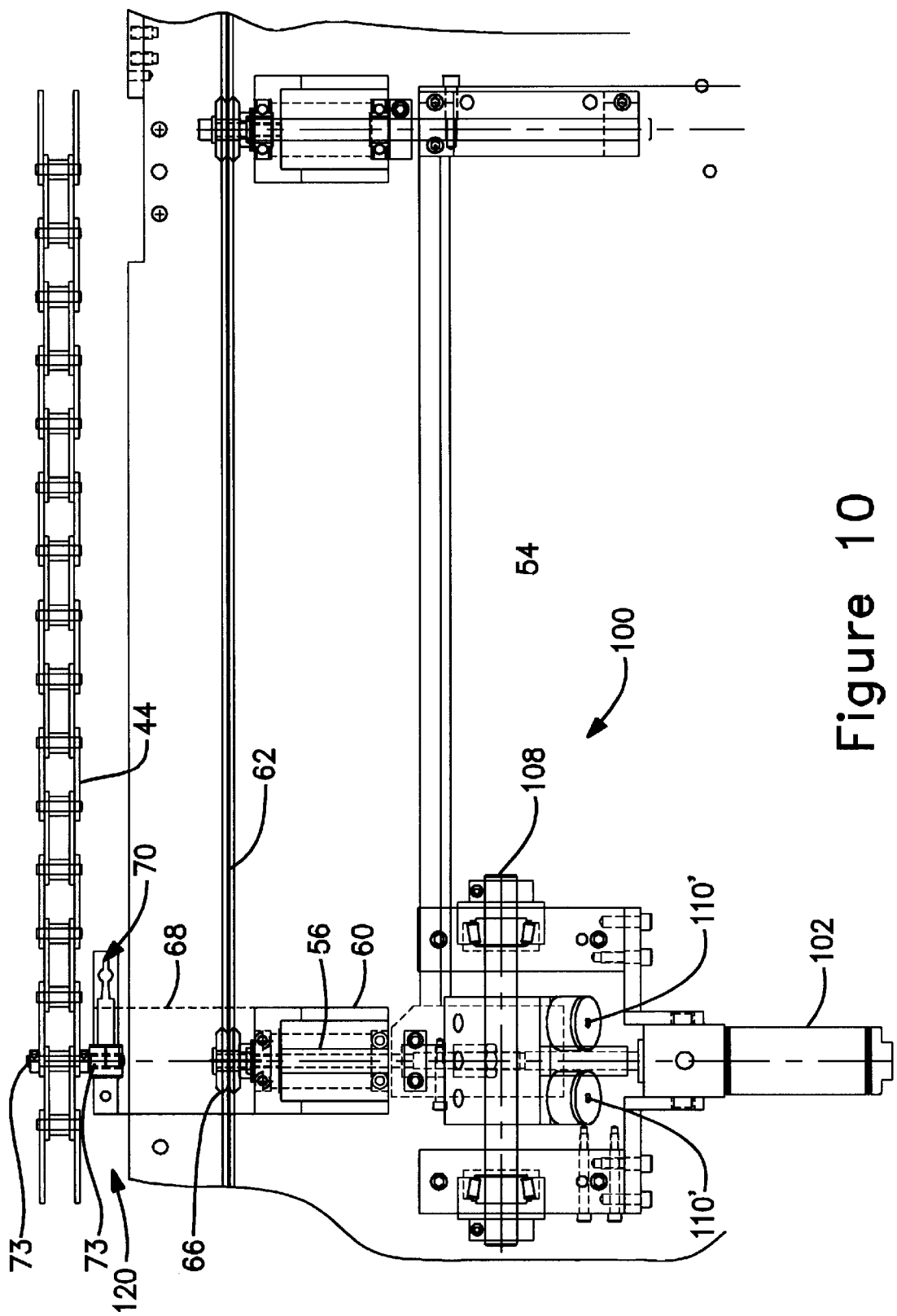
FIG. 10 is a top view of the inventive indexing apparatus showing the interaction between one platen and a registration assembly, the registration assembly being shown in the retracted position.

The structure of and cooperation between registration assembly 100 and platens 54 will now be introduced with primary reference to FIGS. 7–10. As shown therein, registration assembly 100 is rigidly affixed to top support plate 28 of a respective workstation and is capable of movement between a retracted position (FIG. 7) and an alignment position (FIG. 8). In the retracted position, the registration assembly 100 cannot engage registration member (or follower axle shaft) 56 of pallet 54. Conversely, in the alignment position, registration assembly 100 can urge pallet 54 into precise alignment with a predetermined location on the workstation due to engagement between cam followers 110 and registration member 56 (see FIG. 8). Preferably, registration assembly 100 is rotatable between the retracted and alignment positions about an axis-defining pivot axle 108 which is at least substantially perpendicular to the elongated direction of the registration member 56.

As shown in FIGS. 7–10, registration assembly 100 preferably includes a rigid frame 101, a rotator arm 106, a cam follower 110 and an actuator 102 having a movable member 104 attached to rotator arm 106 for rotating the rotator arm 106 between the retracted and alignment positions. Rigid frame 101 affixes registration assembly 100 to support plate 28 of a respective workstation and includes a pivot axle 108 which is coaxial with the axis of rotation. Rotator arm 106 is mounted for rotation about pivot axle 108 and, thus, the position of rotator 106 defines the retracted and alignment positions of registration assembly 100.

As shown in FIG. 8, for example, cam follower 110 engages registration member 56 when registration assembly 100 is in the alignment position to thereby urge pallet 54 into precise alignment with a predetermined location of the workstation. Cam follower 110 preferably includes a pair of wheels 110' which are separated by a converging gap G and mounted to rotator 106 for rotation about respective parallel wheel-axes. These wheel-axes are preferably at least substantially perpendicular to pivot axle 108. As shown, for example, in FIG. 8, registration member 56 is urged into converging gap G between wheels 110' as rotator arm 106 rotates from the retracted to the alignment position.

Also as shown in FIGS. 7–10, rotator arm 106 includes first and second ends on opposite sides of pivot axle 108. Cam follower 110 is affixed to the first end of rotator 106. Additionally, the second end of rotator 106 is preferably attached to a clevis assembly 104' which, in turn, is mechanically coupled to a movable member 104 of actuator cylinder 102.

Actuator cylinder 102 is preferably a pneumatic cylinder manufactured and sold by BIMBA under the model number BFT175. Naturally, a wide variety of other actuators, be they pneumatic, hydraulic, solenoid-based, etc., can also be used.

Tracks 62 and 64 and cooperating wheels or bearings 66 are manufactured by and can be purchased from BISHOP WISECOVER. A wide variety of known equivalents can be substituted therefor.

In the preferred embodiment, each registration assembly 100 also includes a proximity sensor 112 affixed to frame 101. Sensor 112 detects whether rotator 106 (and, by necessary implication, registration assembly 100) is in the retracted position or in the alignment position. in particular, sensor 112 detects the proximity of the first end of rotator arm 106. Sensor 112 is preferably a hall effect sensor manufactured and sold by KEYENCE. However, a wide variety of other known equivalents, such as capacitive sensors, physical switches, etc. can be substituted for the preferred hall effect sensor while still retaining a high degree of utility.

Those of ordinary skill will readily appreciate that sensor 112, drive assembly 35 and actuator cylinder 102 are preferably connected to a computer which serves as a controller to coordinate movement of these various components. Control system specifics and operation of the control system will be discussed in greater detail below with reference to FIGS. 11 and 12.

Registration member or axle shaft 56 is preferably approximately ½ inch in diameter. Gap G is also preferably a minimum of ½ inch in length in order to snugly accommodate registration member 56 between wheels 110' of cam follower 110. These preferred cam follower wheels 110' are approximately ½ inch in diameter and are manufactured and sold by MCGILL. However, many other equivalent wheels could also be utilized.

Those of ordinary skill will readily appreciate that the dimensions of the components noted above result in an in-line indexer which has the theoretical capability of correcting alignment errors up to ⅝ths of an inch in either direction of the target location. Naturally, this is a vast improvement over the shot pin/aperture arrangements of the prior art which only provide for a maximum error correction of about ¹⁄₁₀ of an inch. It will also be appreciated that the dimensions of the various components can be modified as desired in order to achieve other amounts of adjustability.

The present invention also includes a detented safety coupling assembly 120 for releasably coupling drive assembly 35 and pallets 54. Coupling assembly 120 ensures that movement of drive assembly 35 causes corresponding movement of pallets 54 when the forces acting on coupling assembly 120 do not exceed a predetermined value. By contrast, coupling assembly 120 ceases to mechanically couple drive assembly 35 and pallets 54 when the forces acting thereon exceed a predetermined value.

Figure 11:
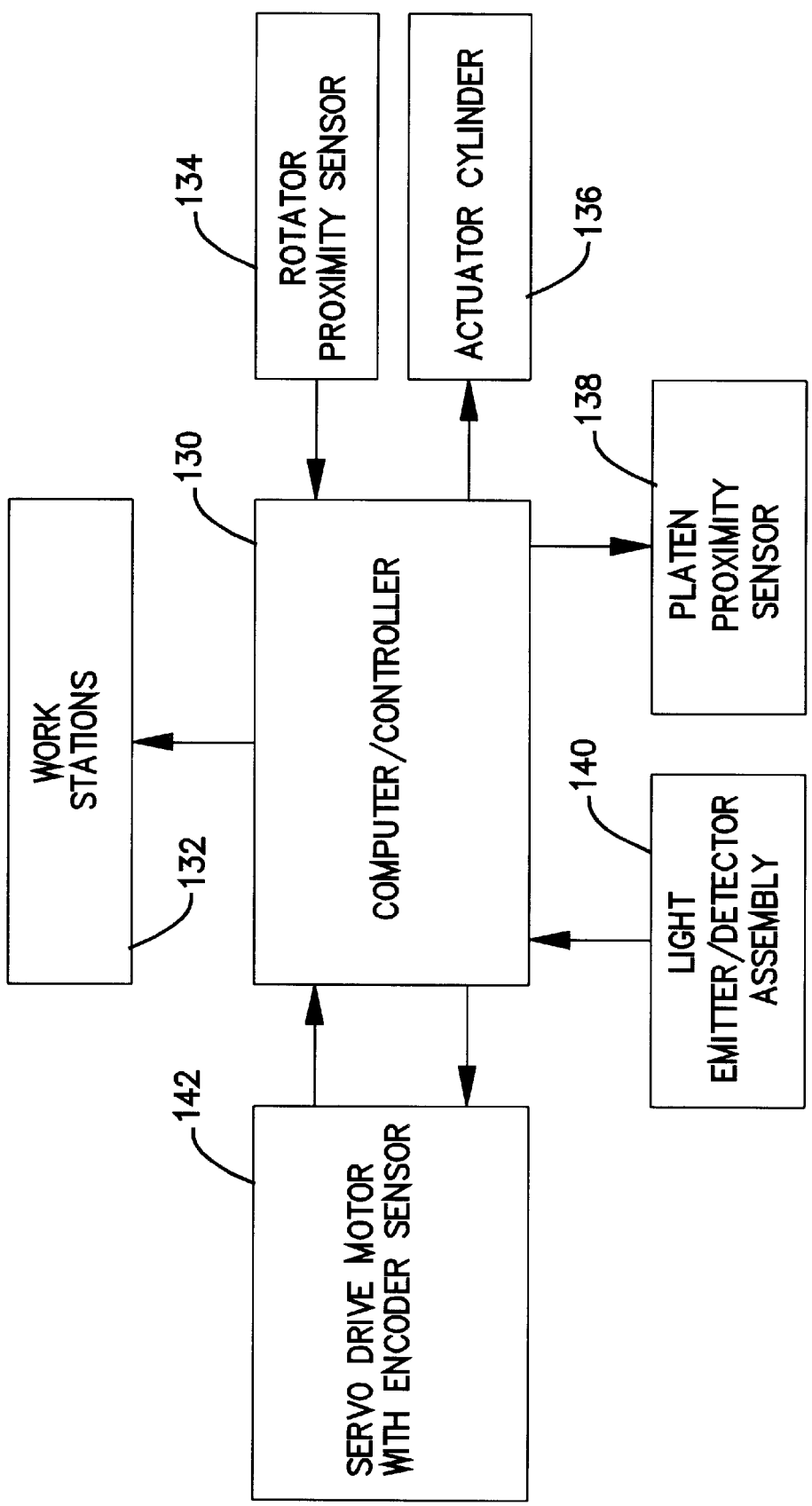
FIG. 11 is a block diagram of the control system for controlling the inventive indexing apparatus when utilized in an in-line printing apparatus.

An optional, but preferred, feature of the safety coupling assembly includes a light emitter/detector assembly 140 as schematically shown in FIGS. 2, 3 and 11. The preferred light assembly 140 is a focused diode laser and a companion laser detector which are disposed at opposite ends of linear path L. Preferably, an assembly 140 is located along each of the upper and lower runs of chain 44. Decoupling of coupling assembly 120 along either of the upper or lower runs will cause rotation of the drag-link pin (preferably due to the force of gravity) and thereby block transmission of the laser beam 140' from the laser to the detector. On the upper run, the flag portion 70' blocks laser beam transmission. On the lower run, the opposite portion 70" blocks laser beam transmission. Thus, decoupling of even one platen will be detected and the apparatus will immediately stop further advancement of the pallet to permit correction of the problem and to prevent further damage. This automatic safety shut-down feature offers a high degree of safety in the event of an obstruction, such as when an operator's limb is caught in the apparatus. The preferred breakage load of the detented coupling assembly is about 80 lbs.

A preferred block diagram of the inventive indexer with an associated control system for controlling the inventive indexing apparatus is shown in FIG. 11. As shown therein, the heart of the control system is a controller 130 which takes the form of a personal computer, as is known in the art. As indicated with arrows, controller 130 is operationally associated with workstations 132, a rotator proximity sensor 134 (also indicated by sensor 112 in FIG. 7), an actuator cylinder 136 (also indicated by actuator 102 in FIG. 7), a platen proximity sensor 138, a light emitter/detector assembly 140, and a servo drive motor with encoder sensor 142 (such as drive motor 38). Naturally, controller 130 selectively commands operation of workstations 132, actuator cylinders 136 and drive motor 142. Conversely, controller 130 receives information from rotator proximity sensors 134, platen proximity sensors 138 (periodically disposed along linear path L) and light emitter/detector assembly 140.

Figure 12:
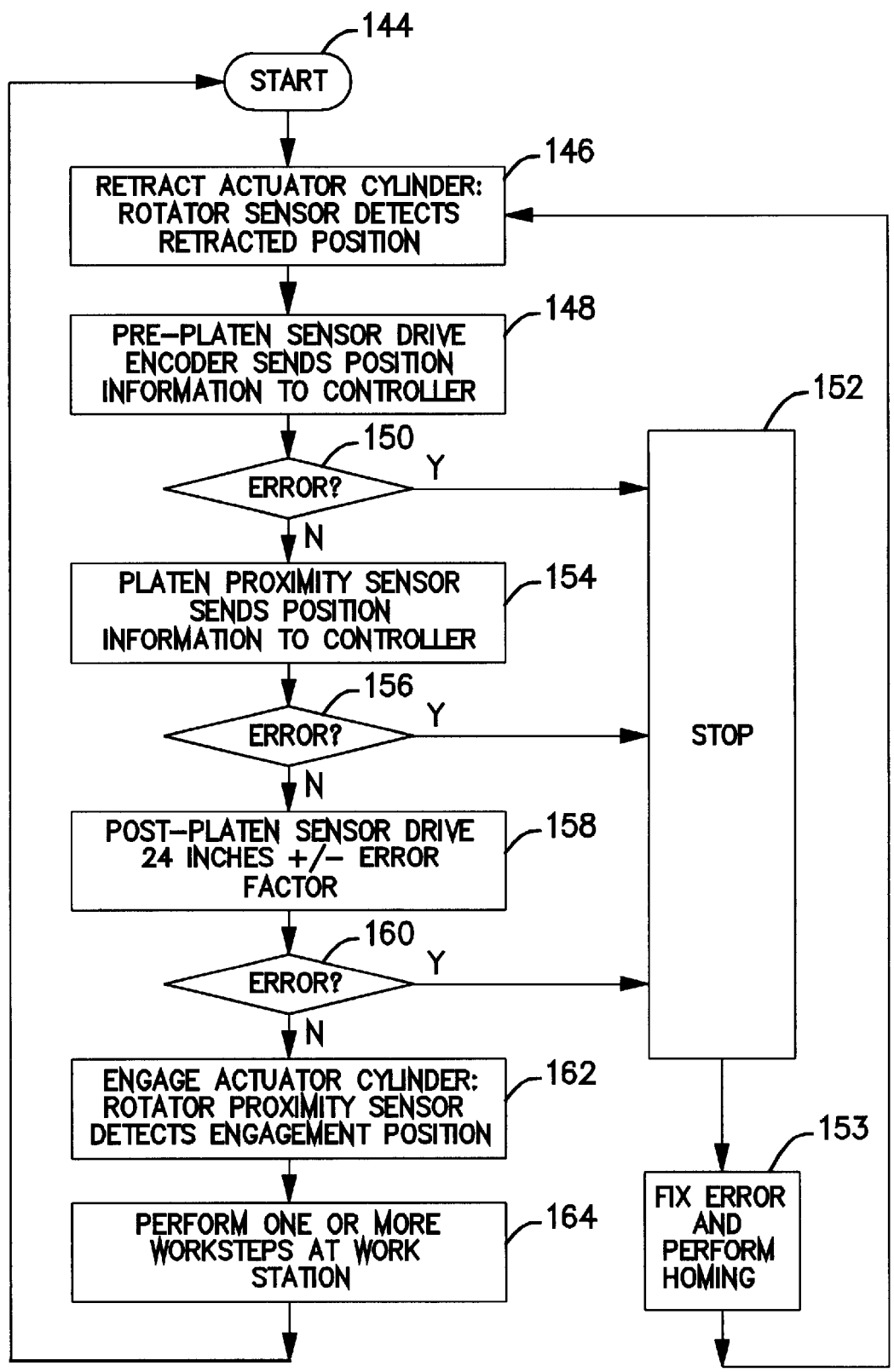
FIG. 12 is a flow chart showing operation of the control system of FIG. 11.
Figure 13A:
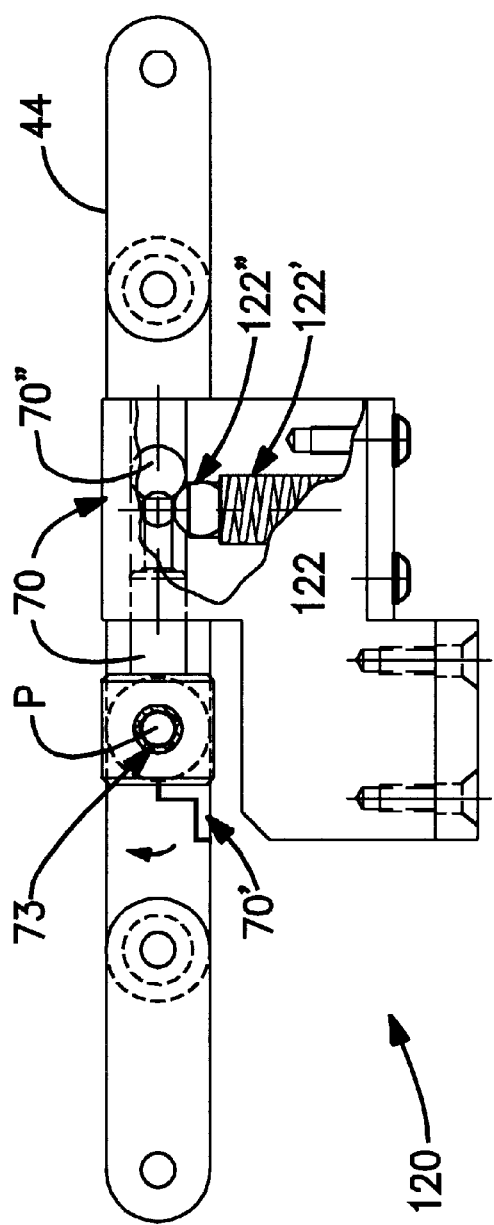
FIG. 13a is a side elevation view of the preferred safety coupling assembly shown in connection with a portion of the drive assembly.
Figure 13B:
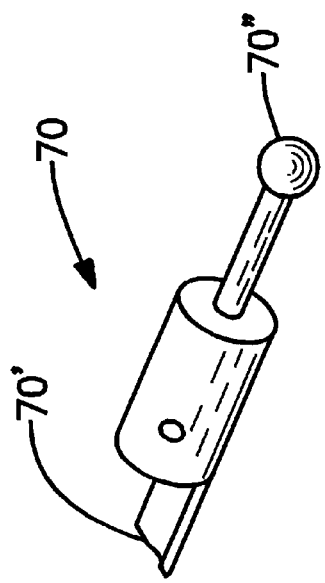
Figure 14:
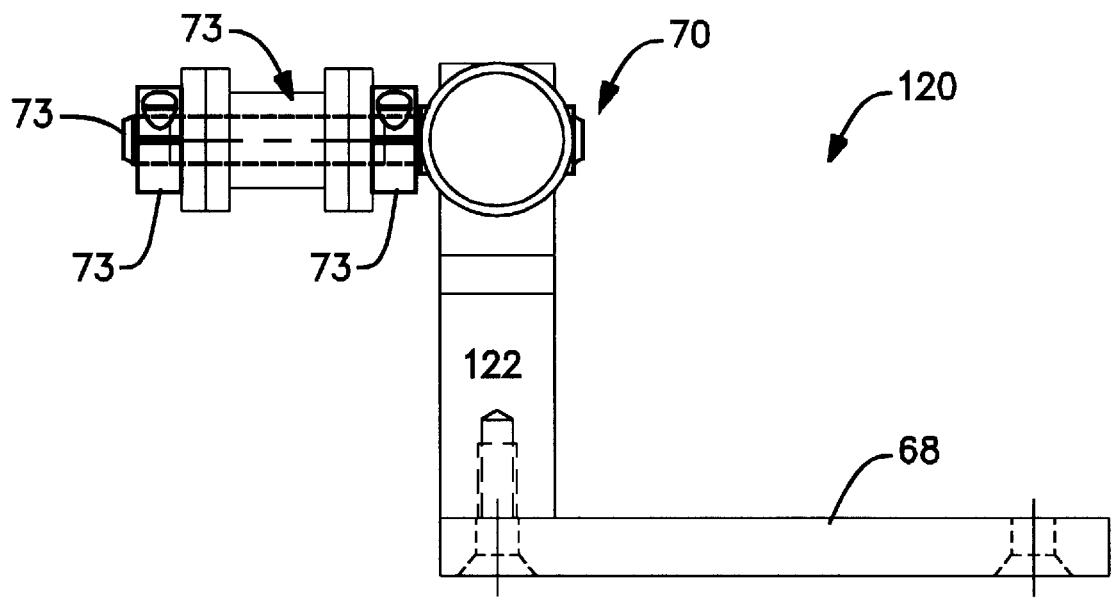
FIG. 14 is a front elevation view of a portion of the safety coupling assembly of the present invention.
Figure 15:
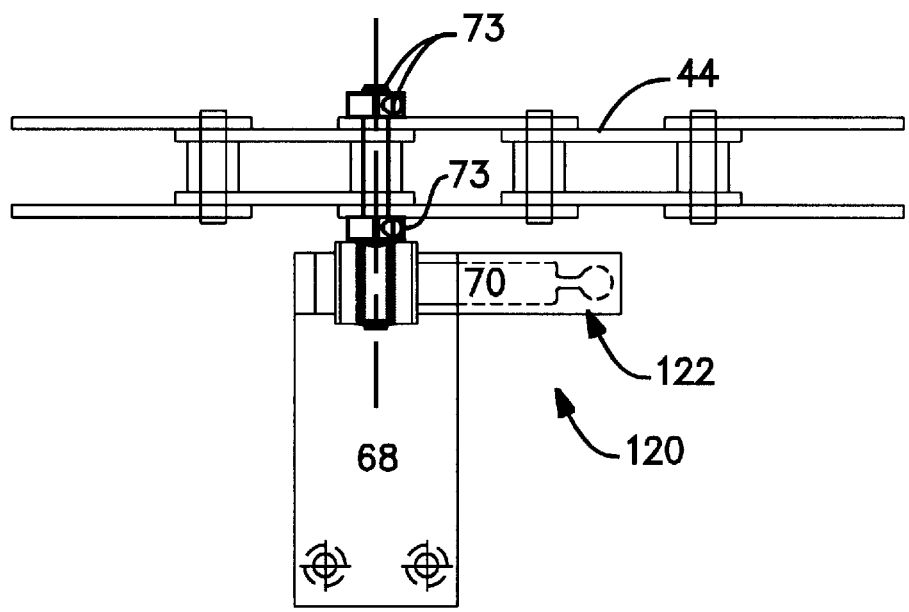
FIG. 15 is a top plan view of a portion of the safety coupling assembly of the present invention shown in conjunction with a portion of the drive assembly.

The preferred operation of the apparatus and control system of FIG. 11 is shown in the flow chart of FIG. 12.

Operation of the apparatus of FIG. 11 begins with block 144 and immediately passes to block 146. At block 146, controller 130 causes actuator cylinder 136 to retract which, in turn, forces registration assembly 100 into the retracted position. Once this happens, rotator proximity sensor 112 detects this condition and information to that effect is sent to controller 130 at which point the process passes to block 148. Once at block 148, controller 130 causes drive motor 38 (142) to advance the drive assembly 35 thereby urging platens 54 along the linear path L. Simultaneously, encoder information is fed back to controller 130 from drive motor 142 so that controller 130 can monitor operation of drive motor 142 throughout all further movement. Once movement of drive motor 142 commences, controller 130 immediately monitors for an error signal as indicated in block 150. Such an error signal may result from, for example, decoupling of platens 54 from drive assembly 35 as detected by light emitter/detector assembly 140 (FIGS. 2 and 3). As discussed above, light assembly 140 preferably produces a laser beam from a focused diode laser and detects the same in the absence of a coupling failure. Several preferred laser assemblies are manufactured by and may be purchased from KEYENCE.

If an error is detected, the process immediately stops as indicated by block 152. Then, the error must be fixed (manually or otherwise) and a homing operation must be performed (block 153) so that controller 130 has a general idea of where the various components of the inventive apparatus are located prior to recommencing normal operations.

If no error is detected, drive motor 142 continues to operate until one or more of platens 54 come into proximity with platen proximity sensor 138. As indicated in box 154, this information is then sent to controller 130 and the process passes to 156 where error monitoring of the type discussed above continues.

In the event that there is no error, the process passes to block 158 where controller 130 causes drive motor 142 to advance platens 54 twenty-four more inches. Naturally, the figure twenty-four inches has been selected in accordance with the preferred embodiment and other dimensions could easily be utilized as long as the predetermined distance brings platens 54 into proximity with a predetermined location on the respective workstations. Once the post-platen sensor drive phase begins, controller 130 immediately monitors for operation errors of the type discussed above. This is illustrated in block 160. Naturally, if an error occurs, the process passes through blocks 152 and 153 before recommencing at block 144.

Once the post-platen sensor drive phase (block 158) has been completed, controller 130 causes actuator cylinder 136 to engage (see block 162). This causes registration assembly 100 to assume the engagement position and rotator proximity sensor 132 detects this condition. Naturally, such information is sent to controller 130 for processing.

At this point, platens 54 have been precisely aligned at predetermined locations on respective workstations and accurate and reliable work steps can be performed on a workpieces supported by platens 54. Thus, block 164 indicates that controller 130 causes workstations 132 to perform one or more work steps while platens 154 remain stationary. Once the appropriate work steps have been performed, the process passes back to block 146 for repetition as desired.

Those of ordinary skill will readily appreciate that a wide variety of minor variations to the process described above are possible. For example, it will be appreciated that if, at any point during movement of drive motor 142, rotator sensor 112 indicates that registration assembly 100 is in the engagement position, the process will immediately terminate. Additionally, it will also be appreciated that, as is customary in the art, the encoder sensor of drive motor 142 constantly delivers information to controller 130 (not just at block 148). In other words, the encoder sensor merely begins to send position information to the controller at block 148.

While the present invention has been described in connection with what is presently considered to be the most practical and preferred embodiment, it is to be understood that the invention is not limited to the disclosed embodiment, but is intended to cover the various modifications and equivalent arrangements included within the spirit and scope of the appended claims.

What is claimed is:

1. An indexing apparatus for sequentially advancing a workpiece so that a series of work steps can be performed on the workpiece, the apparatus comprising:

a plurality of workstations arranged in spaced relationship along a linear path such that at least one of the work steps can be performed on the workpiece at each workstation;

at least one pallet having a support surface for supporting the workpiece as the pallet passes through the workstations;

a movable drive assembly for advancing the pallet along the linear path to thereby sequentially move the pallet into proximity with each workstation; and a detent safety coupling assembly releasably coupling the drive assembly and the pallet such that movement of the drive assembly causes corresponding movement of the pallet when the forces acting on the coupling assembly do not exceed a predetermined value and such that the coupling assembly ceases to couple the drive assembly and the pallet, without breakage of the coupling assembly, when the forces acting on the coupling assembly exceed a predetermined value, the coupling assembly comprising a drag-link pin assembly with a drag-link pin movably attached to the drive assembly and a detent engagement assembly affixed to the pallet, the engagement assembly releasably engaging the drag-link pin.

2. The indexing apparatus of claim 1 wherein the detent engagement assembly comprises a spring-loaded ball plunger.

3. The indexing a apparatus of claim 1 wherein the drive assembly comprises a drive motor and an endless conveyor having upper and lower runs disposed on the apparatus such that the upper run is at least generally congruent with the linear path whereby indexing of the endless conveyor along the upper run causes indexing of the pallet along the linear path.

4. The indexing apparatus of claim 3 wherein
the endless conveyor is a chain; and
the indexing apparatus further comprises:
first and second end units disposed along the linear path at opposite ends of the plurality of workstations;
two sprockets about which the chain is disposed, one of the sprockets being disposed within one of the end units and the other of the sprockets being disposed within the other of the end units; and
the coupling assembly releasably couples the pallet to the chain.

5. The indexing apparatus of claim 1 wherein the drag-link pin assembly further comprises a coupling pin;

the drag-link pin is pivotably attached to the drive assembly at a pivot point by the coupling pin; and the coupling assembly further comprises means for rotating the drag-link pin about the pivot point when the engagement assembly becomes decoupled from the drag-link pin.

6. The indexing apparatus of claim 5 wherein the drag-link pin includes a flag portion disposed on one side of the drag-link pin pivot point; and the means for rotating comprises a weighted portion of the drag-link pin which is heavier than the flag portion, the weighted portion being disposed on an opposite side of the pivot point relative to the flag portion such that decoupling of the coupling assembly causes the flag portion to move upwardly.

7. The indexing apparatus of claim 5 further comprising:

at least one light emitter/detector assembly for detecting rotation of the drag-link pin about the pivot point, and means for preventing the drive assembly from advancing the pallet when rotation of the drag-link pin has been detected.

8. The indexing apparatus of claim 1 wherein the drag-link pin is movably attached to the drive assembly such that the drag-link pin moves from a retracted position to an extended position when the engagement assembly becomes decoupled from the drag-link pin; and the apparatus further comprises means for detecting when the drag-link pin is in the retracted position and/or the extended position.

9. The indexing apparatus of claim 8 wherein the means for detecting comprises at least one light emitter/detector assembly.

10. The indexing apparatus of claim 8 further comprising means for preventing the drive assembly from advancing the pallet when the drag-link pin is in the extended position.

11. The indexing apparatus of claim 8 further comprising a computer for controlling operation of the indexing apparatus; and the computer prevents the drive assembly from advancing the pallet when the drag-link pin is in the extended position.

12. A coupling apparatus for use with an indexing apparatus for advancing a workpiece through a series of workstations arranged in spaced relationship, the indexing apparatus including, at least one pallet which supports the workpiece as the pallet passes through the workstations and a drive assembly for moving the pallet through the workstations, the coupling apparatus comprising:

a detent safety coupling assembly releasably coupling the drive assembly and the pallet such that movement of the drive assembly causes corresponding movement of the pallet when the forces acting on the coupling assembly do not exceed a predetermined value and such that the coupling assembly ceases to couple the drive assembly and the pallet, without breakage of the coupling assembly, when the forces acting on the coupling assembly exceed a predetermined value, the coupling assembly including a drag-link pin assembly with a drag-link pin movably attached to the drive assembly; and a detent engagement assembly affixed to the pallet, the engagement assembly releasably engaging the drag-link pin.

13. The coupling apparatus of claim 12 wherein the detent engagement assembly comprises a spring-loaded ball plunger.

14. The coupling apparatus of claim 12 wherein the drag-link pin includes a flag portion and is pivotably attached to the drive assembly at a pivot point such that the flag portion is disposed on one side of the pivot point; and the coupling assembly further comprises means for rotating the drag-link pin about the pivot point when the engagement assembly becomes decoupled from the drag-link pin such that the flag portion moves upwardly.

15. The coupling apparatus of claim 14 further comprising:

at least one light emitter/detector assembly for detecting rotation of the drag-link pin about the pivot point; and means for preventing the drive assembly from advancing the pallet when rotation of the drag-link pin has been detected.

16. The coupling apparatus of claim 12 wherein the drag-link pin is movably attached to the drive assembly such that the drag-link pin moves from a retracted position to an extended position when the engagement assembly becomes disengaged from the drag-link pin; and the coupling assembly further comprises means for detecting when the drag-ling pin is in the retracted position and/or the extended position.

17. The coupling apparatus of claim 16 wherein the means for detecting comprises at least one light emitter/detector assembly.

18. The coupling apparatus of claim 16 further comprising means for preventing the drive assembly from advancing the pallet when the drag-link pin is in the extended position.

19. The coupling apparatus of claim 16 wherein the coupling assembly further comprises a computer for controlling operation of the indexing apparatus; and the computer prevents the drive assembly from advancing the pallet when the drag-link pin is in the extended position.

* * * * *